United States Patent
Choi et al.

(10) Patent No.: US 9,204,124 B2
(45) Date of Patent: *Dec. 1, 2015

(54) METHOD FOR SERVICE COMPATIBILITY-TYPE TRANSMITTING IN DIGITAL BROADCAST

(71) Applicant: Korea Electronics Technology Institute, Seongnam-si, Gyeonggi-do (KR)

(72) Inventors: Byeong Ho Choi, Yongin-si (KR); Hwa Seon Shin, Seongnam-si (KR); Jae Gon Kim, Goyang-si (KR); Byung Tak Lee, Goyang-si (KR); Euy Doc Jang, Goyang-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/104,868

(22) Filed: Dec. 12, 2013

(65) Prior Publication Data

US 2014/0168364 A1    Jun. 19, 2014

Related U.S. Application Data

(63) Continuation of application No. 13/989,678, filed as application No. PCT/KR2011/000362 on Jan. 18, 2011, now Pat. No. 8,928,733.

(30) Foreign Application Priority Data

Nov. 27, 2010    (KR) .................. 10-2010-0119247

(51) Int. Cl.
  *H04N 13/00*    (2006.01)
  *H04N 21/23*    (2011.01)
  *H04N 21/236*    (2011.01)
  *H04N 21/81*    (2011.01)

(52) U.S. Cl.
  CPC ..... *H04N 13/0059* (2013.01); *H04N 21/23608* (2013.01); *H04N 21/816* (2013.01)

(58) Field of Classification Search
  None
  See application file for complete search history.

(56) References Cited

U.S. PATENT DOCUMENTS 6,055,012 A * 4/2000 Haskell et al. .................. 348/48
8,248,461 B2 * 8/2012 Lee et al. ......................... 348/51

(Continued)

FOREIGN PATENT DOCUMENTS

| JP | 2002-218502 A | 8/2002 |
| KR | 10-2009-0036080 A | 4/2009 |
| WO | 2008/069613 A1 | 6/2008 |

OTHER PUBLICATIONS

International Searching Authority International Search Report for PCT/KR2011/000362 dated Nov. 29, 2011.

(Continued)

*Primary Examiner* — Jay Patel
*Assistant Examiner* — Reza Aghevli
(74) *Attorney, Agent, or Firm* — Sughrue Mion, PLLC (57) ABSTRACT

The present invention relates to a method for making 3D stereo digital broadcast service compatible in an MPEG-2-TS format which is used for transmitting and receiving digital TV. To this end, suggested is a method for transmitting detailed information which supports both TS-level multiplexing and ES-level multiplexing when left and right compressed bitstreams are multiplexed, when service compatibility is enabled.

5 Claims, 10 Drawing Sheets

(56) References Cited

U.S. PATENT DOCUMENTS

| | | | |
|---|---|---|---|
| 8,493,434 B2* | 7/2013 | Broberg | 348/43 |
| 2007/0002041 A1* | 1/2007 | Kim et al. | 345/419 |
| 2007/0183454 A1* | 8/2007 | Kim et al. | 370/486 |
| 2009/0141814 A1* | 6/2009 | Yin et al. | 375/240.29 |
| 2009/0225869 A1* | 9/2009 | Cho et al. | 375/240.26 |
| 2010/0134592 A1* | 6/2010 | Kim et al. | 348/43 |
| 2010/0157025 A1* | 6/2010 | Suh et al. | 348/51 |
| 2010/0182402 A1* | 7/2010 | Nakajima et al. | 348/42 |
| 2010/0208042 A1* | 8/2010 | Ikeda et al. | 348/53 |
| 2010/0238264 A1 | 9/2010 | Liu et al. | |
| 2010/0245548 A1* | 9/2010 | Sasaki et al. | 348/51 |
| 2010/0260268 A1* | 10/2010 | Cowan et al. | 375/240.25 |
| 2010/0275238 A1 | 10/2010 | Nagasawa et al. | |
| 2010/0277567 A1* | 11/2010 | Takizuka et al. | 348/43 |
| 2010/0315493 A1* | 12/2010 | Hamada | 348/51 |
| 2010/0325676 A1* | 12/2010 | Kim et al. | 725/105 |
| 2011/0181694 A1 | 7/2011 | Kim et al. | |
| 2012/0044324 A1 | 2/2012 | Lee et al. | |
| 2012/0106921 A1 | 5/2012 | Sasaki et al. | |

OTHER PUBLICATIONS

Office Action issued Mar. 21, 2014 in related U.S. Appl. No. 14/104,823.

Office Action issued May 1, 2014 in related U.S. Appl. No. 13/989,678.

Communication from the U.S. Patent and Trademark Office issued Aug. 27, 2014 in counterpart U.S. Appl. No. 13/989,320.

Communication from the U.S. Patent and Trademark Office issued Sep. 19, 2014 in counterpart U.S. Appl. No. 14/104,823.

* cited by examiner

```
                                    Syntax
TS_program_map_section ( ) {
        table_id
        section_syntax_indicator
        0
        reserved
        section_length
        program_number
        reserved
        version_number
        current_next_indicator
        section_number
        last_section_number
        reserved
        PCR_PID
        reserved
        program_info_length
        for (i = 0; i < N; i++) {
                existing descriptor()s
                // descriptor related to synthesis information regarding left and right images
                service_compatible_stereoscopic_video_descriptor( )
                // frame packing arrangement <- frame-compatible mode descriptor
                MPES2_video_3d_frame_frame_packing_arrangement_descriptor ( )

}
        for (i = 0; i < N1; i++) {
                stream_type
                reserved
                elementary_PID reserved
                ES_info_length
                for (i = 0; i < N2; i++) { existing descriptor()s
                        // descriptor related to information regarding individual ESs of left and right images
                        stereoscopic_stream_descriptor ( )

}
        }
        CRC_32
}
```

FIG. 5A

| Syntax |
|---|
| service_compatible_stereoscopic_video_descriptor ( ) { |
|     descriptor_tag |
|     descriptor_length |
|     Resolution_Conversion_flag |
|     if ( Resolution_Coversion_flag ) { |
|         Primary_Conversion_Type |
|         Secondary_Conversion_Type |
|     } |
|     Interview_prediction_flag |
|     Allowance_of_Secondary_View_Presentation_flag |
|     Alignment_of_GOP_Structure_flag |
|     ES_level_compositon_flag |
|     if ( ES_level_compostion_flag ) // ES-level composition |
|         MVC_bitstream_assembling_flag |
|     reserved (for byte-alignment) |
| } |

FIG. 5B

```
                                    Syntax
service_compatible_stereoscopic_video_descriptor () {
            descriptor_tag
            descriptor_length
            Resolution_Conversion_flag
            if ( Resolution_Coversion_flag ) {
                        Primary_Conversion_Type
                        Secondary_Conversion_Type
            }
            Interview_prediction_flag
            Allowance_of_Secondary_View_Presentation_flag
            Alignment_of_GOP_Structure_flag
            ES_level_composition_flag
            if ( !ES_level_composition_flag ) {// TS-level composition
                        Primary_PID_flag
                        if ( Primary_PID_flag ) {
                                    Primary_PID
                                    Right_Is_Primary_flag
                        reserved (for byte-alignment)
            }
            else {      // ES-level composition}
                        MVC_bitstream_assembling_flag
                        if (!MVC_bitstream_assembling_flag )
                                    Stream_Byte_Offset
                        reserved (for byte-alignment)
            }
            reserved (for byte-alignment)
}
```

FIG. 6

```
                                    Syntax
Stereoscopic_stream_descriptor( ){
            descriptor_tag
            descriptor_length
            if(!ES_level_composition_flag) {    //TS-level composition
                        Primary_flag
                        Left_flag
            } else {
                        First_Primary_flag
                        First_Left_flag
            }
            reserved (for byte-alignment)
}
```

FIG. 7

```
                                    Syntax
MPEG2_video_3d_frame_packing_arrangement_descriptor {
       descriptor_tag
       descriptor_length
       frame_packing_data_present
     If (frame_packing_data_present)
         Frame_packing_arrangement_type
         else  {
                  Reserved   }
}
```

METHOD FOR SERVICE COMPATIBILITY-TYPE TRANSMITTING IN DIGITAL BROADCAST

CROSS-REFERENCE TO RELATED APPLICATIONS

This application is a continuation of U.S. patent application Ser. No. 13/989,678 filed on Jun. 7, 2013, which is a National Stage Application of PCT/KR2011/000362 filed on Jan. 18, 2011, which claims priority from Korean Patent Application No. 10-2010-0119247 filed on Nov. 27, 2010, the contents of which are hereby incorporated by reference in their entirety.

TECHNICAL FIELD

The present invention relates to a service-compatible mode of a 3D stereoscopic digital broadcast in a MPEG-2 Transport Stream (TS) format for broadcasting used for digital TV transmission and reception.

BACKGROUND ART

In Korea, a standard of Advanced Television Systems Committee (ATSC) in North America, which is an 8-VSB system, was adopted as a terrestrial digital broadcast system in November 1997. Subsequently, related core technology has been developed, field tests have been carried out, and test broadcasting has been performed. Since 2001, existing analog broadcasting and digital broadcasting have been simultaneously performed. In 2012, however, switch to digital broadcasting will have been completed.

ATSC is an America committee developing a digital television broadcasting standard or a standard of the committee. The standard of ATSC has been used as a national standard in America, Canada, Mexico, and Korea. In addition, the standard of ATSC will be adopted in other countries, including several nations in South America. In addition to ATSC, DVB, which has been developed in Europe, and ISDB of Japan are used as the standard of the digital broadcasting.

According to an ATSC digital broadcasting standard that is capable of transmitting high-quality video, audio, and auxiliary data, data are transmitted at a data transmission rate of 19.39 Mbps for a terrestrial broadcast channel of 6 MHz and data are transmitted at a data transmission rate of 38 Mbps for a cable TV channel. An ISO/IEC 13818-2 MPEG-2 video standard is used as a video compression technology used in the ATSC system. MPEG-2 MP@HL, i.e. Main Profile and High Level, is used as a compression format. Video formats and limitations related thereto are defined.

Hereinafter, a description will be given of transmission modes which may be used when a new broadcast, such as a 3D stereoscopic broadcast, ultra high definition (UHD) TV broadcast, or multi-view broadcast, is provided while maintaining compatibility with existing broadcast channels in a MPEG-2 TS format for broadcasting used for digital TV transmission and reception. Hereinafter, the 3D stereoscopic broadcast, UHD TV broadcast, and multi-view broadcast will be referred to as a composite image broadcast. Transmission modes which may be used in the MPEG-2 TS format are divided into a frame-compatible mode and a service-compatible mode. In a case in which two transmission modes are used in a digital broadcast, it is necessary for a receiving end to recognize a transmission mode used by a transmission end.

DISCLOSURE

Technical Problem

An object of the present invention is to provide a method of transmitting detailed information of a 3D broadcast.

Another object of the present invention is to provide a method of transmitting detailed information of a service-compatible mode, which is one transmission mode of a 3D broadcast.

A further object of the present invention is to provide a method of transmitting detailed information supporting both TS-level multiplexing and ES-level multiplexing when multiplexing left and right compression bitstreams in a service-compatible mode.

Technical Solution

In accordance with an aspect of the present invention, the above objects may be accomplished by the provision of a method of transmitting detailed information supporting both TS-level multiplexing and ES-level multiplexing when multiplexing left and right compression bitstreams in a service-compatible mode.

Advantageous Effects

The present invention provides a method of transmitting detailed information supporting both TS-level multiplexing and ES-level multiplexing when multiplexing left and right compression bitstreams in a service-compatible mode during 3D broadcasting.

When 3D broadcasting is performed using the method of transmitting detailed information according to the present invention, it is possible to realize efficient broadcast transmission and reception based on various service-compatible mode environments, such as TS-level multiplexing and ES-level multiplexing, while maintaining compatibility with an existing broadcast using an existing broadcasting system.

DESCRIPTION OF DRAWINGS

FIGS. 5A and 5B are views showing service_compatible_stereoscopic_video_descriptor according to an embodiment of the present invention, in particular, FIG. 5A shows an example in which PID is not used and FIG. 5B shows an example in which PID is used;

DESCRIPTION OF THE REFERENCE NUMERALS

Figure 2:
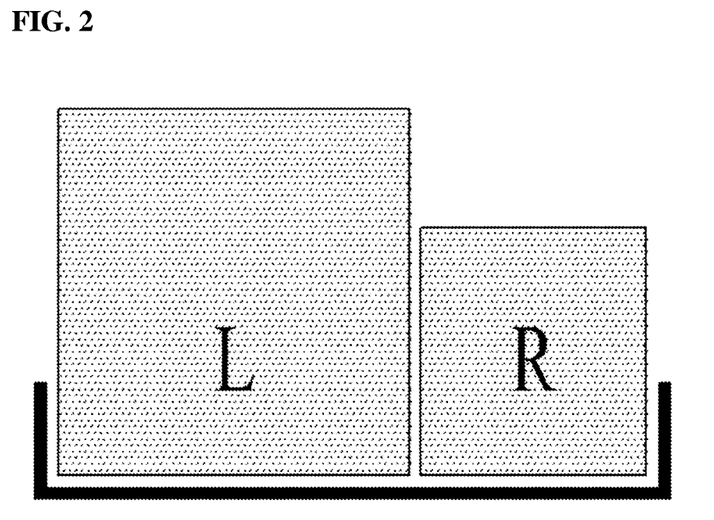
FIG. 2 is a view showing a service-compatible mode according to an embodiment of the present invention.

FIG. 2: Frame-compatible mode FIG. 3: Service-compatible mode

Best Mode

The above and other aspects of the present invention will be more clearly understood from the following detailed description of preferred embodiments taken in conjunction with the accompanying drawings. Hereinafter, the detailed description of the preferred embodiments of the present invention will be given to enable those skilled in the art to easily understand and reproduce the invention.

First, types of digital broadcasts will be described. Generally, digital broadcasts are classified into a 3-D stereoscopic broadcast, an Ultra High Definition (UHD) TV broadcast, and a Multi-view broadcast.

An HD broadcast transmits one image. However, the 3-D stereoscopic broadcast transmits two images, the UHD broadcast transmits four images (in case of 4k), and the multi-view broadcast transmits two or more images.

The 3-D stereoscopic broadcast is a method of assigning a Packet Identifier (PID) for MPEG2-TS to left and right images and performing multiplexing transmission to transmit a stereo type three-dimensional stereoscopic image. A UHD image generally has a number of horizontal and vertical pixels ranging from 4000 level (4k·3840×2160) to 8000 level (8k·7680×4320). Since image resolution depends upon the number of pixels, the 4k-based UHD image is four times clearer than an HD image (2k·1920×1080). The 8k-based UHD image is sixteen times clearer than the HD image. The HD image has a refresh rate, i.e. the number of frames per second, of 30 Hz. In the UHD image, on the other hand, 60 images are transmitted per second, thereby realizing much more natural and dynamic images.

In the multi-view broadcast, two images, such as top and bottom images or left and right images, having angles different according to a users' viewing angle are combined such that the users view a 3-D stereoscopic image. In a case in which a television is provided with a multi-view display device, a left person views a left face of a performer and a right person views a right face of the performer when the performer appears on a screen. That is, the multi-view broadcast is an advanced type of the 3-D stereoscopic broadcast.

The present invention proposes a transmission and reception standard for transmission modes suitable to perform a new broadcast while maintaining compatibility with an existing broadcast channel when using any one selected from among the 3-D stereoscopic broadcast, the UHD TV broadcast, and the multi-view broadcast.

Hereinafter, a frame-compatible mode, which is one of the transmission modes, will be described first and then a service-compatible mode, which is another of the transmission modes, will be described.

Figure 1A:
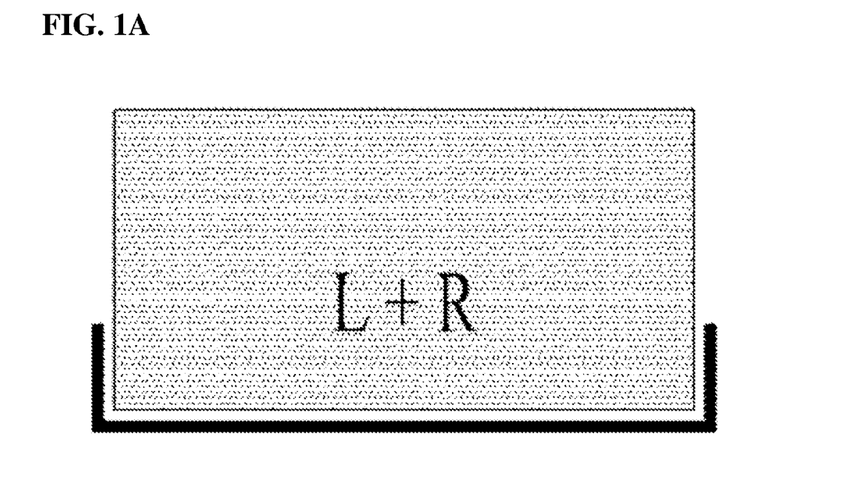
FIG. 1A shows a frame-compatible mode and FIG. 1B shows examples of methods of synthesizing images to configure the frame-compatible mode.
Figure 1B:
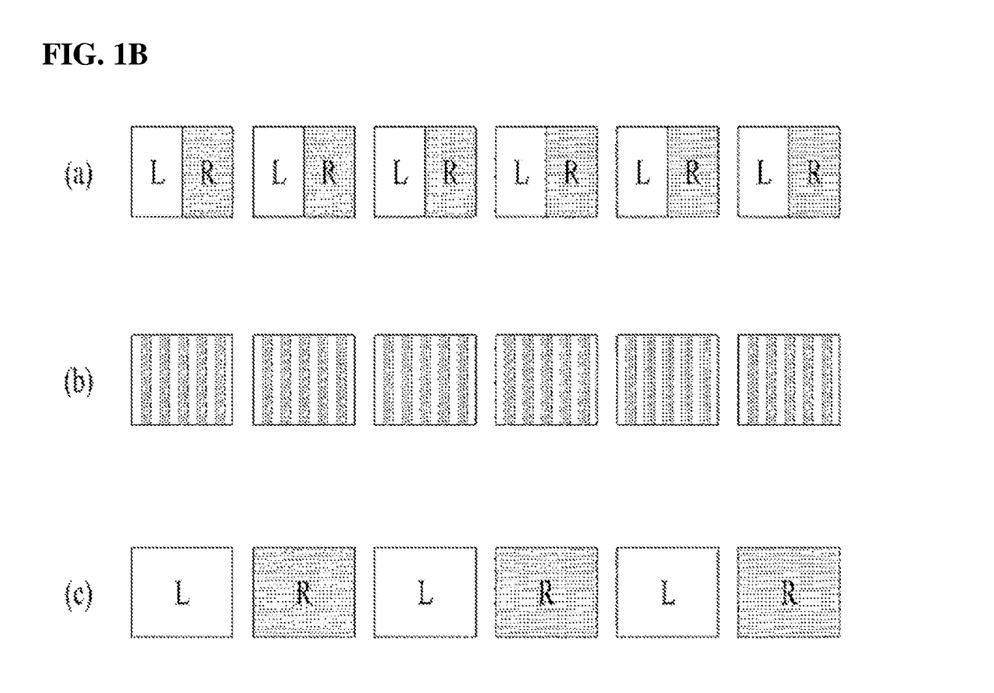

FIG. 1A shows a frame-compatible mode and FIG. 1B shows examples of methods of synthesizing images to configure the frame-compatible mode. FIGS. 1A and 1B show an example of a 3-D stereoscopic broadcast. However, the present invention may be extended to a UHD TV broadcast and a multi-view broadcast in a similar manner. Hereinafter, the frame-compatible mode will be described in detail with reference to FIGS. 1A and 1B.

Referring to FIG. 1B, a frame containing combined left and right images is transmitted through a transmission band in the frame-compatible mode. Consequently, a transmission and reception form identical to a form used in a conventional HD broadcast may be maintained. However, the broadcast in the frame-compatible mode is different from the conventional HD broadcast in that the conventional HD broadcast transmit a video to the entire region but the broadcast in the frame-compatible mode transmits an image synthesized based on the number of images. That is, as shown in FIG. 1B, a left image and a right image may be synthesized into a frame using various methods. As shown in FIG. 2B(a), a frame may be divided into two halves and then synthesized. As shown in FIG. 1B(b), a frame may be divided in pixel steps and then synthesized. Alternatively, as shown in FIG. 1B(c), left and right images may be sequentially transmitted while a frame is maintained. In FIGS. 1B(a) and 1B(b), a specific number of images are synthesized into a frame; therefore, a process of reducing each image is necessary. In FIG. 1B(c), a frame-rate is increased; therefore, it is necessary to increase a bandwidth or to adjust a video compression bitrate. There are various methods of synthesizing images. In the 3-D stereoscopic image as shown in FIG. 1B, the left image and the right image may be changed or the images may be mixed in diagonal pixel steps.

In the 3-D stereoscopic broadcast, for example, both the left image and the right image are transmitted through one transmission band. Consequently, the 3-D stereoscopic broadcast has an half lower image resolution than in a case in which an image frame is transmitted with the result that image quality is deteriorated (FIGS. 1B(a) and 1B(b)). Otherwise, much more data must be transmitted in the same bandwidth. To this end, it is necessary to increase a compression rate with the result that image quality is deteriorated or a frame rate is lowered (FIG. 1B(c)).

FIG. 2 shows a service-compatible mode. Hereinafter, the service-compatible mode will be described in detail with reference to FIG. 2. FIG. 2 shows an example of a 3-D stereoscopic broadcast. However, the present invention may be extended to a UHD TV broadcast and a multi-view broadcast in a similar manner.

Referring to FIG. 2, a left image frame and a right image frame are individually compressed and transmitted through a transmission band without image synthesis in the service-compatible mode. That is, as shown in FIG. 2, the left image frame and the right image frame are compressed using corresponding compression methods and the compressed left image frame and right image frame are transmitted through one transmission band. In order to transmit two or more compressed images through a limited transmission band, one of the image is compressed so as to be compatible with an existing HD broadcast, whereas the other image is transmitted while being coded using a compression method having a higher compression rate. Alternatively, one of the left and right images is transmitted in a high resolution state and the other image is transmitted in a low resolution state. As an example, the left image is transmitted while being coded using MPEG-2 Main profile and the right image is transmitted while being coded using MPEG-4 AVC/H.264 High profile. In a case in which low resolution is used, an image stream of the left image is transmitted at a resolution of 1080i@60 Hz using the above coding method and an image stream of the right image is transmitted at a resolution of 720p@60 Hz using the above coding method. In addition, the right image is sub-sampled in the vertical or horizontal direction while the left image is not changed and a receiving unit restores the sampled right image so as to correspond to the resolution of the left image to form one stereoscopic image.

When a new broadcast is performed while maintaining compatibility with an existing broadcast channel in the digital broadcast as described above, a transmission mode of a composite broadcast is divided into a frame-compatible mode and a service-compatible mode. An transmission end transmits a compressed image to a receiving end using one of the two transmission modes. The receiving end must recognize the transmission mode used by the transmission end to decode the received compressed image. An existing broadcast receiving system that is not capable of processing the composite images disregards a secondary view of the received composite images and reproduces only a primary view of the received composite images. Consequently, it is possible to selectively receive the composite broadcast while maintaining compatibility with the existing broadcast channel.

Figure 3:
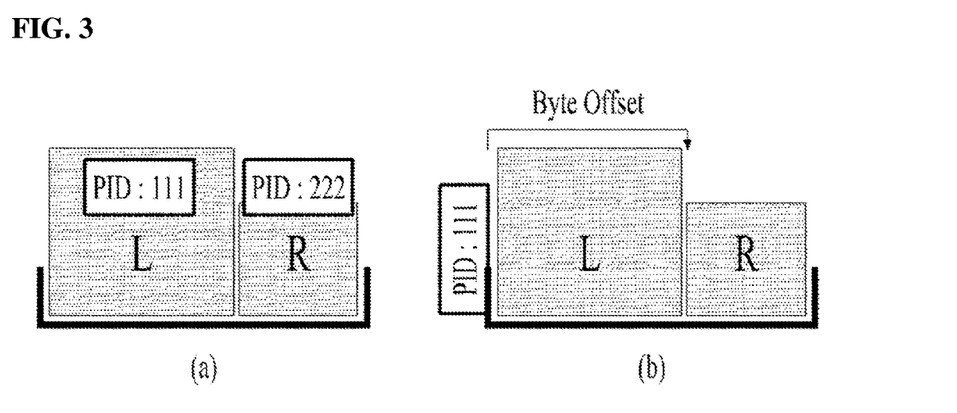
FIG. 3 is a view showing TS-level multiplexing and ES-level multiplexing in the service-compatible mode according to the embodiment of the present invention.

FIG. 3 shows left and right image multiplexing used in the service-compatible mode according to the embodiment of the present invention. Hereinafter, the left and right image multiplexing used in the service-compatible mode according to the embodiment of the present invention will be described with reference to FIG. 3.

Referring to FIG. 3, the multiplexing used in the service-compatible mode is divided into TS-level multiplexing and ES-level multiplexing.

The TS-level multiplexing is a method of assigning different PIDs to Packetized Elementary Streams (PES) acquired by packetizing Elementary Streams (ES) of the left and right images. It is necessary to specify a PID of a reference image. That is, as shown in FIG. 3, different PIDs are assigned to the left image and the right image.

Figure 9:
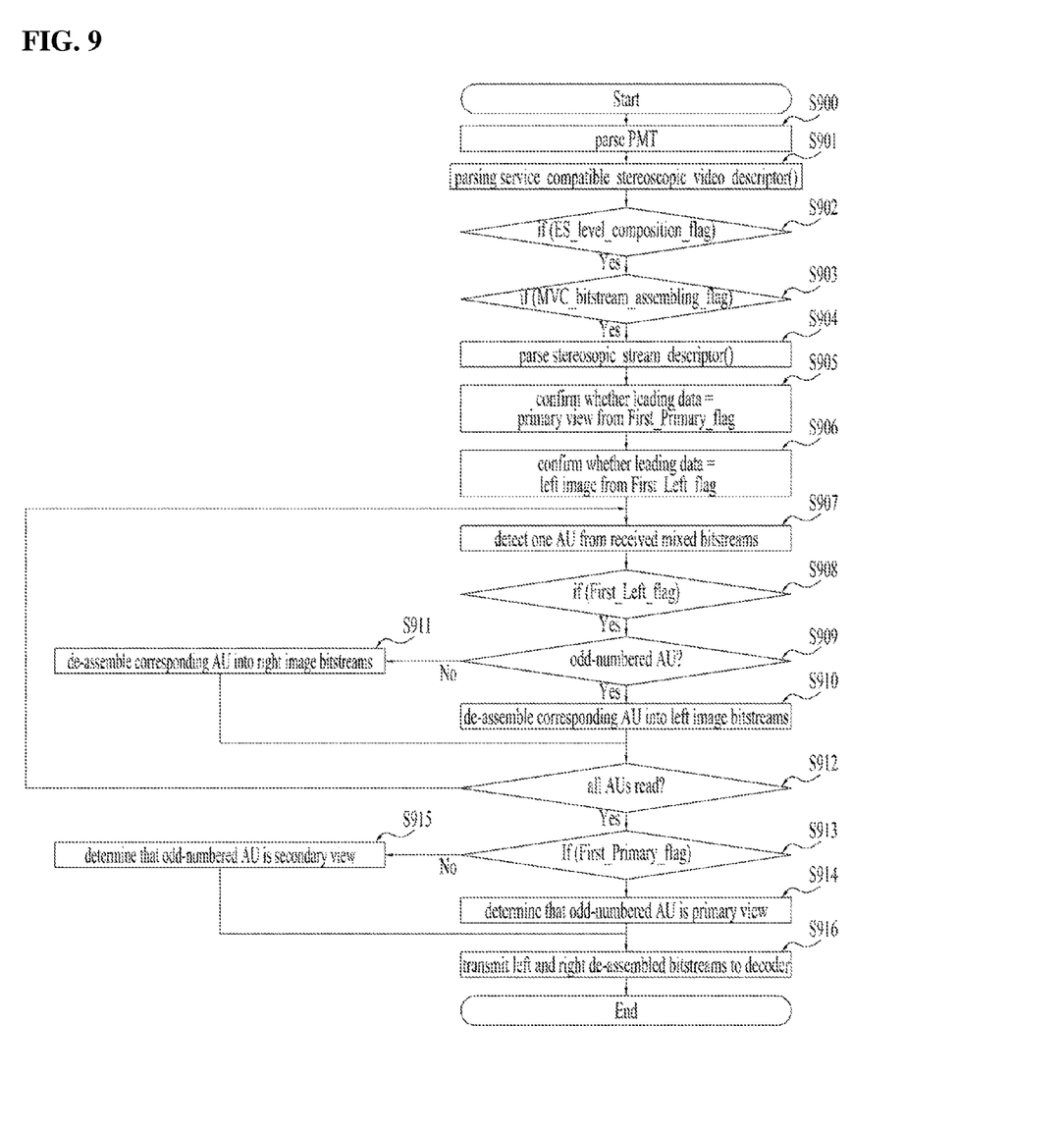
FIG. 9 is a view showing a process of de-assembling bitstreams of left and right images when using an MVC bitstream assembling method in ES-level bitstream multiplexing according to an embodiment of the present invention.
Figure 10:
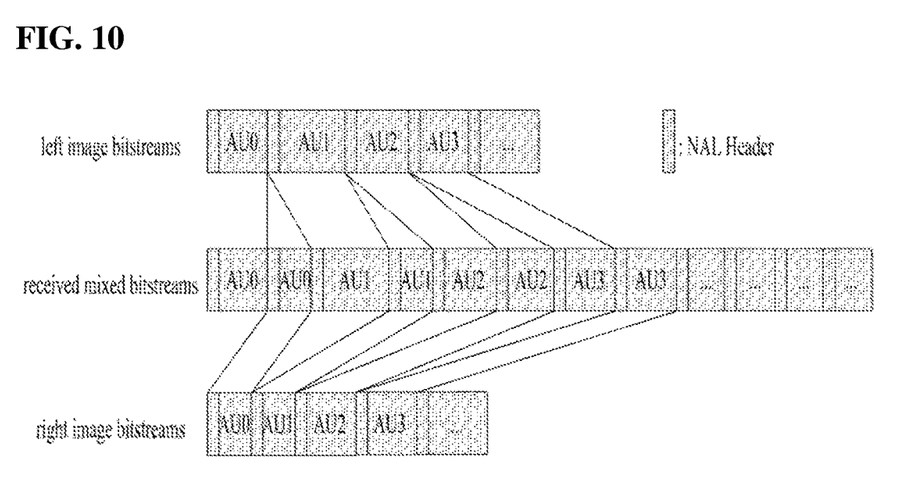
FIG. 10 is a view showing MVC bitstream assembling and de-assembling.

On the other hand, the ES-level multiplexing is a method of combining compressed bitstreams (ES) of the left and right images into one Elementary Stream (ES) and transmitting the Elementary Stream using a PID. In the ES-level multiplexing, therefore, it is necessary to provide a method of dividing one Elementary Stream (ES) into compressed bitstreams of the left and right images. As an example, Byte Offset may be used. That is, as shown in FIG. 3, one PID is assigned to the left image and the right image and offset for division into the left image and the right image is used. That is, the ES-level multiplexing is a method of assembling compressed bitstreams of the left and right images into one compressed bitstream (ES), assigning one PID to a PES acquired by packetizing Elementary Stream (ES), and transmitting the PES. It is necessary for the receiving unit to de-assemble or bitstream extract the PES into compressed bitstreams of the left and right images. As an example, MVC bitstream assembling is used. Alternatively, it is necessary to specify an additional syntax, such as Byte Offset, for de-assembling into two images. FIGS. 9 and 10 show a de-assembling process when using MVC bitstream assembling and assembling and de-assembling.

In an embodiment of the present invention, a receiving system that is capable of processing a 3D image receives identification information to recognize the reception of a 3D image while the identification information is contained in system information. Program Specific Information/Program and System Information Protocol (PSI/PSIP) is applied as system information; however, the present invention is not limited thereto. That is, any protocol transmitting system information as a table format may be applied to the present invention irrespective of the term thereof.

PSI is a system standard of MPEG-2 defined to classify channels and programs. PSIP is a standard of Advanced Television Systems Committee (ATSC) that is capable of classifying channels and programs.

In an embodiment, PSI may include a Program Association Table (PAT), Conditional Access Table (CAT), Program Map Table (PMT), and Network Information Table (NIT).

PAT is specific information transmitted by a packet having a PID of 0. PID information of PMT and PID information of NIT are transmitted for each program by using the PAT. CAT transmits information regarding a charged broadcast system used by the transmission side. PMT transmits PID information of a transport stream packet to transmit individual bitstreams of video and audio constituting a program, program identification number and PID information to transmit PCR. NIT transmits information of a real transmission network. For example, a PAT table having a PID of 0 is parsed to find program number and PID of PMT. PMT obtained from PAT is parsed to know a correlation between components constituting the program.

Figure 4:
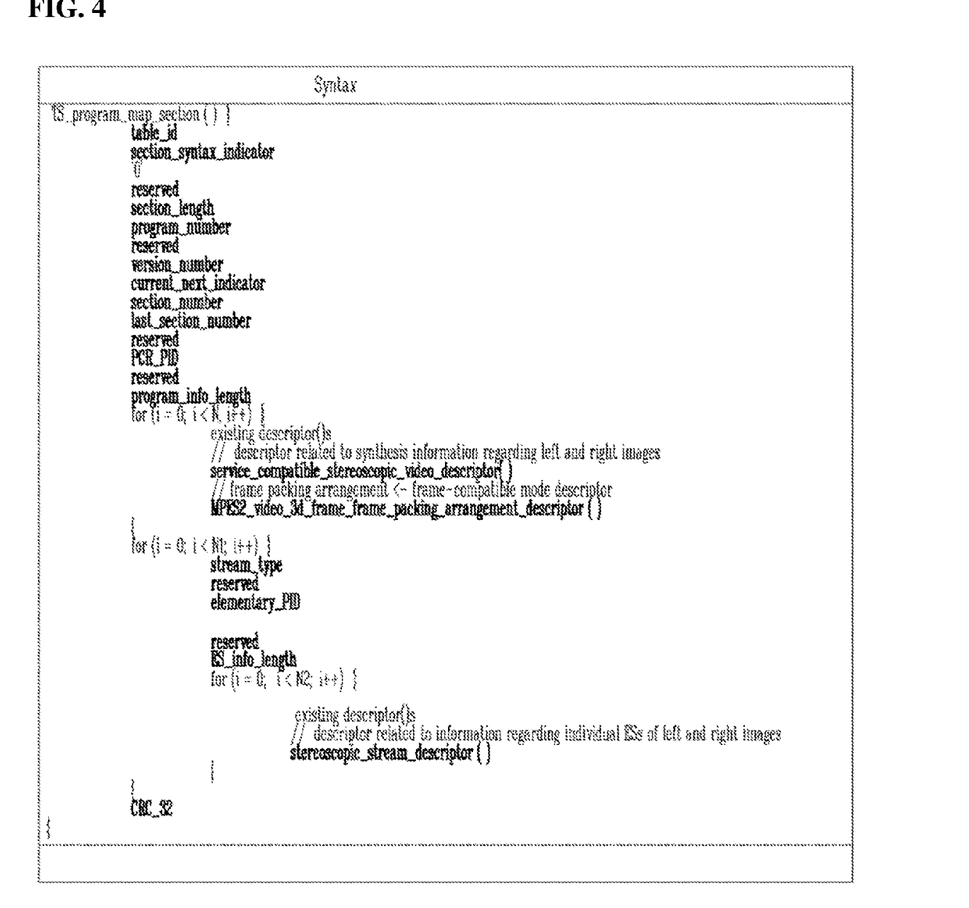
FIG. 4 is a view showing the structure of a program map table (PMT) syntax according to an embodiment of the present invention.

FIG. 4 is a view showing the structure of a program map table (PMT) syntax according to an embodiment of the present invention. Hereinafter, the structure of a program map table (PMT) syntax according to an embodiment of the present invention will be described in detail with reference to FIG. 4.

Referring to FIG. 4, a table_id field is a table identifier. An identifier to indentify PMT may be set. A section_syntax_indicator field is an indicator to define a section form of PMT. A section_length field indicates the section length of PMT.

A program_number field indicates program number as information coinciding with PAT. A version number field indicates version number of PMT. A current_next_indicator field is an indicator to indicate whether the current table section is applicable.

A section_number field indicates section number of the current PMT section when PMT is transmitted while being divided into one or more sections. A last_section_number field indicates last section number of PMT. A PCR_PID field indicates PID of a packet that transmits program clock reference (PCR) of the current program.

A program_info_length field indicates length information of descriptors following the program_info_length field in bytes. That is, the program_info_length field indicates length of descriptors included in a first loop. A stream_type field indicates coding information and type of an elementary stream included in a packet having a PID value indicated by the following elementary_PID field. A elementary_PID field indicates an identifier of the elementary stream, i.e. a PID value of a packet including the elementary stream. An ES_Info_length field indicates length information of descriptors following the ES_Info_length field in bytes. That is, the ES_Info_length field indicates length of descriptors included in a second loop.

In addition, referring to FIG. 4, a descriptor related to synthesis information regarding left and right images for specific program number, i.e. a descriptor related to a transmission mode, is present in a descriptor following a program_info_length syntax. In addition, a descriptor related to individual ESs of left and right images is present in a descriptor following an ES_info_length syntax. Referring to FIG. 4, the descriptor related to synthesis information regarding left and right images is defined as service_compatible_stereoscopic_video_descriptor( ). Information related to frame packing arrangement describes MPEG2_video_3d-frame_packing_arrangement_descriptor( ) defined in the frame-compatible mode. However, MPEG2_video_3d_frame_frame_packing_arrangement_descriptor( ) may not be located at the current position but at a descriptor under ES_info_length. This is because one video PID is provided in the frame-compatible mode; therefore, the PID is present together with the descriptor. The descriptor related to the individual ESs of left and right images is defined as stereoscopic_stream_descriptor( ). Referring to FIG. 4, however, these descriptors are directly expressed in the syntax to indicate the positions of the descriptors. In fact, however, the descriptors are selectively included like conventional descriptors.

Referring to FIG. 4, the descriptor related to synthesis information regarding left and right images for specific program number is first configured and then the descriptor related to individual ESs of left and right images is configured; however, the present invention is not limited thereto. That is, as previously described, the positions of the descriptors of FIG. 4 may be variable as the position of MPEG2_video_3d_frame_frame_packing_arrangement_descriptor( ) is variable.

Table 1 below indicates stream type shown in FIG. 4.

TABLE 1

| Value | Description |
| --- | --- |
| 0x00 | ITU-T/ISO/IEC Reserved |
| 0x01 | ISO/IEC 11172-2 Video |
| 0x02 | ITU-T Rec. H.262/ISO/IEC 13818-2 Video or ISO/IEC 11172-2 constrained parameter video stream |
| 0x03 | ISO/IEC 11172-3 Video |
| 0x04 | ISO/IEC 13818-3 Video |
| ... | ... |
| 0x0A | ISO/IEC 13818-6 type A |
| ... | ... |
| 0x22 | ITU-T Rec. h.262/ISO/IEC 13818-2 Video with stereoscopic count coded using frame packing arrangement |
| ... | ... |
| 0x80-0xFF | User Private |

Figure 5A:
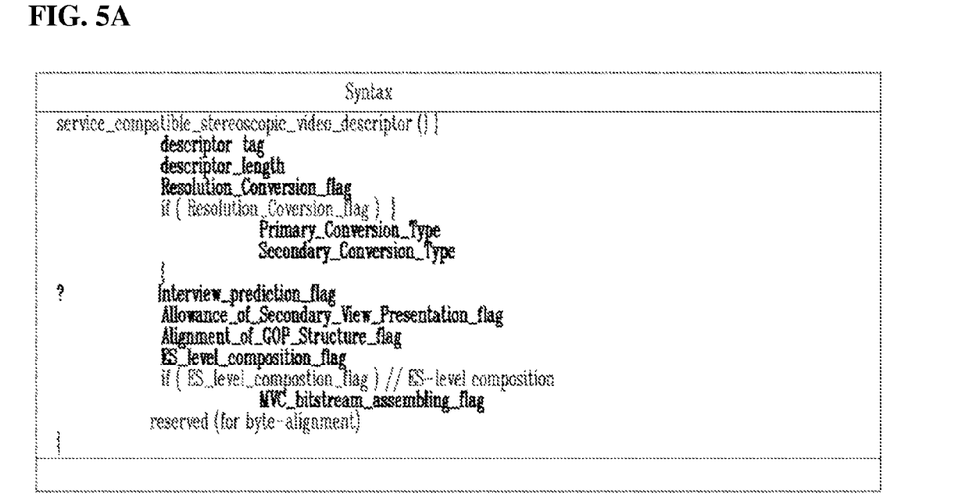
Figure 5B:
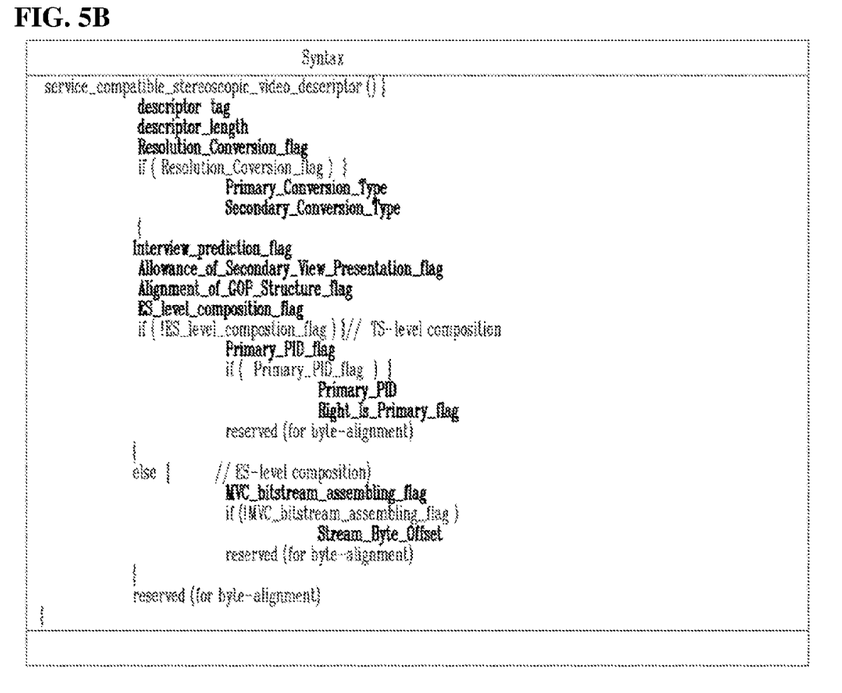

FIGS. 5A and 5B show service_compatible_stereoscopic_video_descriptor according to an embodiment of the present invention. Hereinafter, service_compatible_stereoscopic_video_descriptor according to an embodiment of the present invention will be described in detail with reference to FIGS. 5A and 5B.

As previously described, service_compatible_stereoscopic_video_descriptor is a descriptor related to synthesis information regarding left and right images and includes resolution of the left and right images, limitation of secondary view watching, whether a GOP structure is arranged, and whether ES-level multiplexing is used. Particularly, FIG. 5A shows an example in which PID is not used and FIG. 5B shows an example in which PID is used.

First, an example in which PID is not used will be described with reference to FIG. 5A.

If Resolution_Conversion_flag is 1, it means that Primary_Conversion_Type and Secondary_Conversion_Type syntaxes are present. If Resolution_Conversion_flag is 0, it means that left and right images have the same resolution.

Primary_Conversion_Type indicates division of a primary view based on an original image, which is indicated in Table 2. However, values and items of Table 2 may be changed, reduced, or extended as needed.

TABLE 2

| | Value | | | |
| --- | --- | --- | --- | --- |
| | 0 | 1 | 2 | 3 |
| Meanings | No change in size | Horizontal two division | Vertical two division | Horizontal and vertical two division |

Secondary_Conversion_Type indicates division of a secondary view based on an original image, which is indicated in Table 2.

If Allowance_of_Secondary_View_Presentation_flag is 1, it means that the secondary view may be independently output to a screen as a 2D service. The primary view is allowed to be always independently output to a screen as a 2D service, whereas the secondary view may be prohibited or allowed to be output as 2D according to applications.

If Alignment_of_GOP_Structure_flag is 1, it means that GOP structures of the left and right images coincide with each other. In a case in which the GOP structures of the left and right images do not coincide with each other, it is signaled that it is necessary to perform an additional process for synchronization during presentation according to the GOP structures. Of course, synchronization between the left and right images is basically realized by PTS. However, a necessary process may be previously performed through signaling of the receiving unit. As an example, overall delay is adjusted to one having greater delay of the left and right images.

If ES_level_composition_flag is 1, it means that ES-level multiplexing is used. If ES_level_composition_flag is 0, it means that TS-level multiplexing is used.

Hereinafter, an example in which PID is used will be described with reference to FIG. 5B. However, only other syntaxes except the syntaxes described with reference to FIG. 5a will be described.

Primary_PID_flag is a flag present only in TS-level multiplexing. IF Primary_PID_flag is 1, it means that a Primary_PID syntax is present. Otherwise, stereoscopic_stream_descriptor( ) is present to confirm PID of the primary view.

Primary_PID specifies PID of the primary view to determine the primary view from PID included in PMT.

Right_Is_Primary_flag is a flag present only in TS-level multiplexing. If Right_Is_Primary_flag is 1, it means that the primary view is a right image. Otherwise, it means that the primary view is a left image.

Information regarding the primary view and the left image is provided from service_compatible_stereoscopic_video_descriptor. Consequently, stereoscopic_stream_descriptor is not present and it is possible to distinguish the primary view and the left image using one descriptor. Left_PID may be informed and Right_Is_Primary_flag may be designated using a similar method, which do not deviate from the gist of the present invention.

In a case in which Primary_PID and Right_Is_Primary_flag are used, stereoscopic_stream_descriptor is present to distinguish the primary view and the right image.

Figure 6:
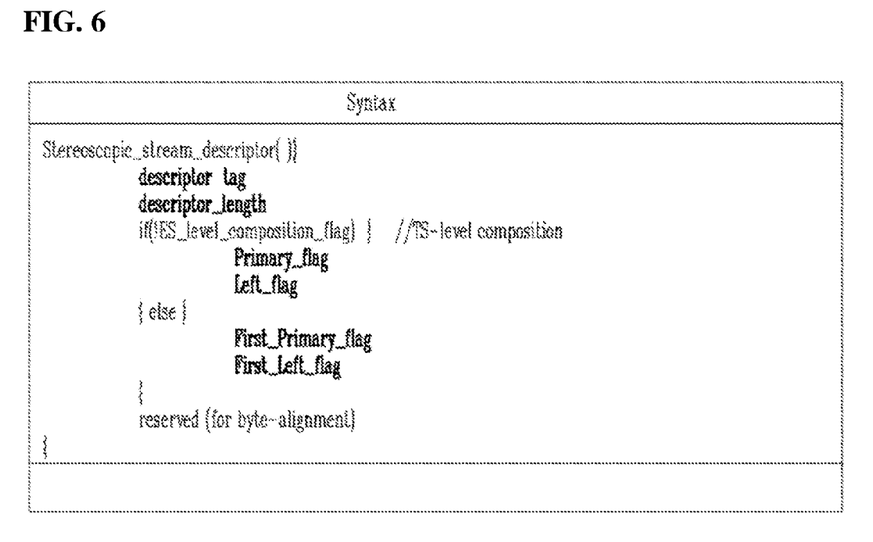
FIG. 6 is a view showing stereoscopic_stream_descriptor according to an embodiment of the present invention.

FIG. 6 show stereoscopic_stream_descriptor according to an embodiment of the present invention. As previously described, stereoscopic_stream_descriptor is a descriptor related to individual ESs of left and right images and serves to specify whether the current ES is a primary view in a stereoscopic image.

In a TS-level composition mode, each ES is described. In an ES-level composition mode, one ES is described. Consequently, this descriptor considers both the two modes.

If Primary_flag is set to 1, it means that the current ES is a primary view. In this case, the primary view must be reproduced.

If Left_flag is set to 1, it means that the current ES is a bitstream of the left image.

If Frist_Primary_flag is set to 1, in a case in which two image bitstreams of ES-level are assembled (interleaved) in arbitrary steps, it is signaled that the first part is a bitstream corresponding to the primary view.

If First_Left_flag is set to 1, in a case in which two image bitstreams of ES-level are assembled (interleaved) in arbitrary steps, it is signaled that the first part is a bitstream corresponding to the left image.

Instead of describing the primary view or the left image, the secondary view of the right image may be described as needed, which do not deviate from the gist of the present invention.

Figure 7:
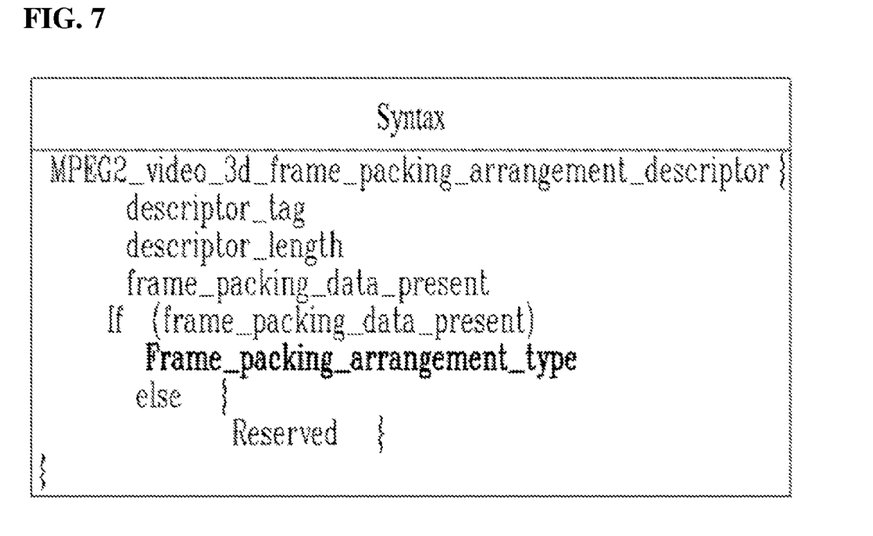
FIG. 7 is a view showing MPEG2_video_3d_frame_frame_packing_arrangement_descriptor according to an embodiment of the present invention.

MPEG2_video_3d_frame_frame_packing_arrangement_descriptor is shown in FIG. 7.

MPEG2_video_3d_frame_frame_packing_arrangement_descriptor( ) defined in the frame-compatible mode is used as information related to Frame packing arrangement. Semantics may also be identical to those defined in the frame-compatible mode.

Figure 8A:
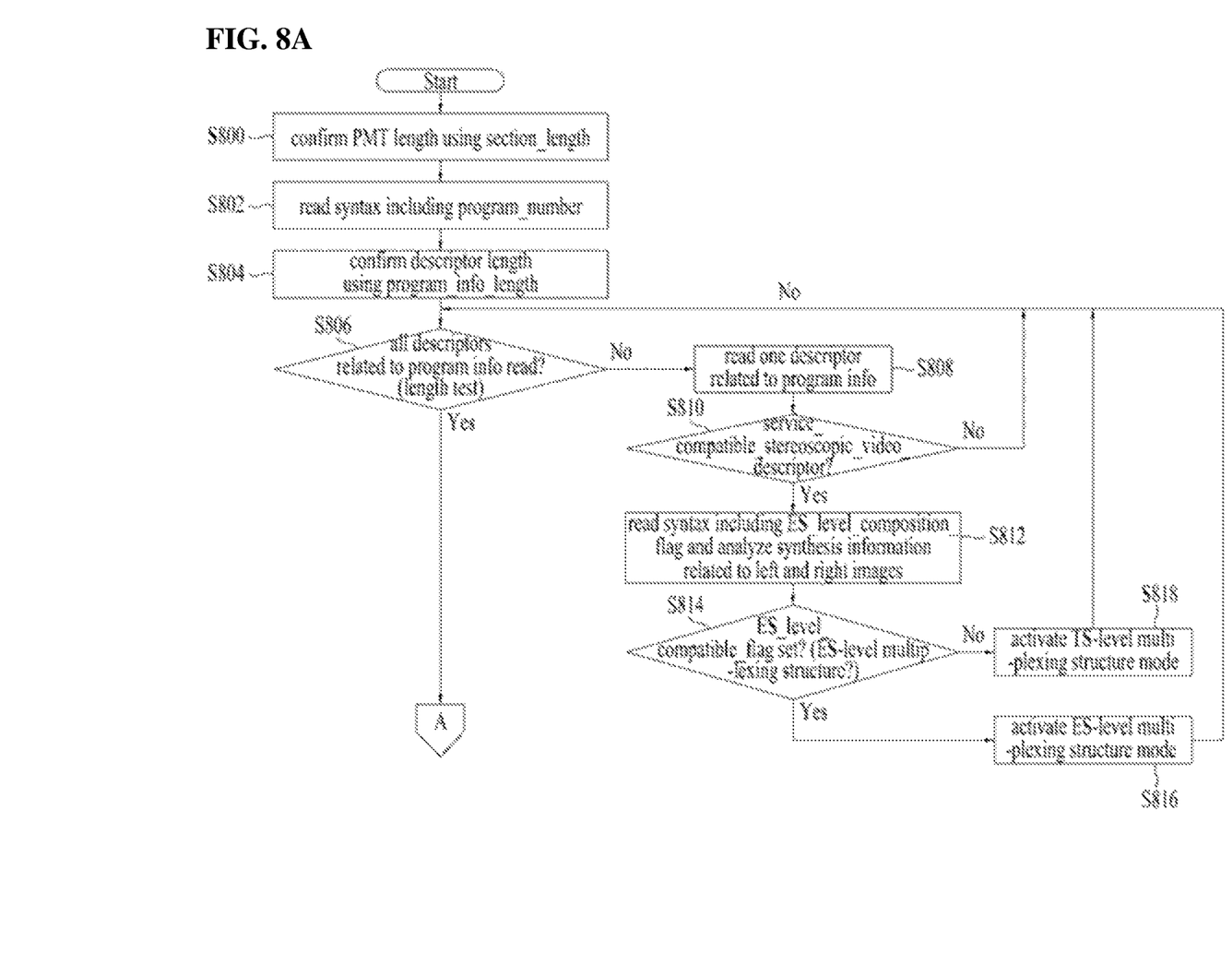
FIGS. 8A and 8B are a flowchart showing a multiplexing process in the service-compatible mode according to the embodiment of the present invention.
Figure 8B:
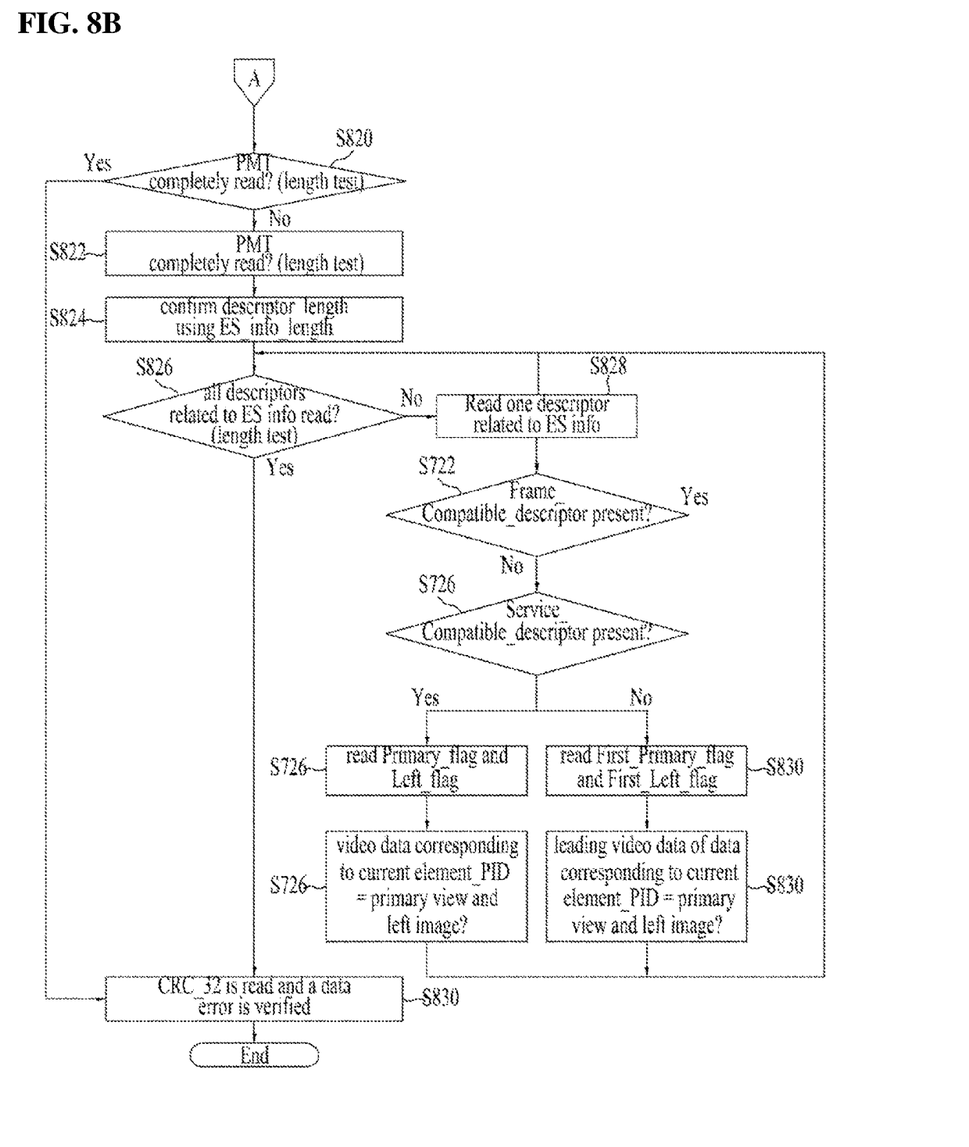

FIGS. 8A and 8B are flowcharts showing a multiplexing process in the service-compatible mode according to the embodiment of the present invention. Hereinafter, a multiplexing process in the service-compatible mode according to the embodiment of the present invention will be described with reference to FIGS. 8A and 8B.

At S800, a PMT length is confirmed using section_length.

At S802, a syntax including program number is read.

At S804, a descriptor length is confirmed using program_info_length.

At S806, it is confirmed whether all descriptors related to program info have been read. If all descriptors have been read, the procedure moves to S820 through A described in FIGS. 8A and 8B. If all descriptors have not been read, the procedure moves to S808, where one descriptor related to program info is read.

At S810, it is confirmed whether the read descriptor is service_compatible_stereoscopic_video_decriptor. If the read descriptor is service_compatible_stereoscopic_video_decriptor, the procedure moves to S812. If the read descriptor is not service_compatible_stereoscopic_video_decriptor, the procedure moves to S806.

At S812, a syntax including ES_level_composition_flag is read to analyze synthesis information related to left and right images.

At S814, it is confirmed whether ES_level_compatible_flag has been set. If ES_level_compatible_flag has been set, the procedure moves to S816. If ES_level_compatible_flag has not been set, the procedure moves to S818.

At S816, an ES-level multiplexing structure mode is activated. At S818, a TS-level multiplexing structure mode is activated.

At S820, it is confirmed whether the PMT has been completely read. If the PMT has been completely read, the procedure moves to S842. If the PMT has not been completely read, the procedure moves to S822. At S822, stream_type and elementary_PID are read.

At S824, a descriptor length is confirmed using ES_info_length.

At S826, it is confirmed whether all descriptors related to ES info have been read. If all descriptors have been read, the procedure moves to S820. If all descriptors have not been read, the procedure moves to S828.

At S828, one descriptor related to ES info is read and the procedure moves to S830.

At S830, it is confirmed whether the read descriptor is stereoscopic_stream_descriptor. If the read descriptor is stereoscopic_stream_descriptor, the procedure moves to S834. If the read descriptor is not stereoscopic_stream_descriptor, the procedure moves to S838.

At S834, Primary_flag and Left_flag are read. At S836, it is determined whether video data corresponding to the current element_PID are a primary view and a left image.

At S838, First_Primary_flag and First_Left_flag are read. At S842, it is determined whether leading video data of data corresponding to the current element_PID are a primary view and a left image.

At S842, CRC_32 is read and a data error is verified.

FIG. 9 is a flowchart showing a process of de-assembling ES-level multiplexed bitstreams. Hereinafter, a process of de-assembling ES-level multiplexed bitstreams in a service-compatible mode according to an embodiment of the present invention will be described with reference to FIG. 9. The following process is performed on the assumption that bitstreams are mixed in order of left to right. Those skilled in the art will appreciate that bitstreams may be mixed in order of right to left.

At S900, PMT is parsed.

At S901, service_compatible_stereoscopic_video_descriptor( ) in PMT is parsed.

At S902, ES_level_composition_flag is confirmed to determine ES-level multiplexing.

At S903, MVC_bitstream_assembling_flag is confirmed to determine whether assembling of bitstreams in ES-level multiplexing conforms MVC bitstream assembling (defined in stereo_high_profile or multiview_high_profile).

At S904, stereosopic_stream_descriptor( ) in PMT is parsed.

At S905, First_Primary_flag is confirmed.

At S906, First_Left_flag is confirmed.

At S907, one AU is detected from received mixed bitstreams.

At S908, it is determined whether leading data are a left image from First_Left_flag confirmed at S906.

At S909, it is determined whether the AU detected at S907 is odd-numbered AU. If the AU detected at S907 is odd-numbered AU, the procedure moves to S910. If the AU detected at S907 is even-numbered AU, the procedure moves to S911.

At S910 and 5911, the corresponding AU is de-assembled into left image or right image bitstreams using the information determined at S909.

At S912, it is determined whether all AUs have been read. If all AUs have been read, the procedure moves to S913. If all AUs have not been read, the procedure moves to S907.

At S913, it is determined whether leading data are a left image from First_Primary_flag confirmed at S906. If First_Primary_flag is 1, the procedure moves to S914. If First_Primary_flag is 0, the procedure moves to S915.

At S914 and 5915, it is determined which of the bitstreams is a primary view using the Primary information determined at S913.

At S916, the de-assembled bitstreams are transmitted to a decoder.

FIG. 10 is a view showing a bitstream de-assembling method according to MVC Bitstream Extraction corresponding to S907 to S912. When mixed left and right bitstreams are received, it can be seen that the bitstreams are assembled in AU steps and the first AU is a primary view or a left image through the process shown in FIG. 9. Consequently, the bitstreams of the left and right images may be de-assembled as shown in FIG. 10 although NAL Header is not parsed to confirm view_id and anchor_pic_flag present in the NAL Header.

Although the present invention has been described with reference to the embodiments shown in the drawings, the embodiments are illustrative. Therefore, those skilled in the art will appreciate that various and equivalent modifications may be embodied from the above embodiments.

Although the above description is focused on a 3D stereoscopic broadcast, which is being currently tested and broadcast standards of which are under establishment, broadcasting in the frame-compatible mode and in the service-compatible mode may be performed in other composite broadcasts, such as a UHD TV broadcast and a multi-view broadcast. Consequently, the present invention is applicable to other composite broadcasts, such as a UHD TV broadcast and a multi-view broadcast, as well as a 3D stereoscopic broadcast.

The invention claimed is:

1. A method of processing a stereoscopic three-dimensional (3D) service in a digital television, the method comprising:

receiving a broadcast signal comprising a transport stream (TS), wherein the TS includes a Program Association Table (PAT);

parsing the PAT, which has a specific packet identifier (PID), from the received TS;

acquiring a Program Map Table (PMT) based on a PMT_PID included in the parsed PAT; and processing the acquired PMT comprising both of at least two fields and at least two descriptors, wherein a first field among the at least two fields indicates a PID of the TS, and a second field among the at least two fields identifies a stream type of the TS, wherein a first descriptor among the at least two descriptors specifies a type of service that is provided, the service type corresponding to a two-dimensional (2D) service, a frame-compatible stereoscopic 3D service or a service-compatible stereoscopic 3D service, wherein a second descriptor among the at least two descriptors provides information related to the service-compatible stereoscopic 3D service that carries left and right views in separate video streams, the second descriptor further comprising:

first data indicating that a video stream included in the TS is a base video stream or an additional view video stream, second data indicating that the video stream is a left view video stream or a right view video stream, and third data indicating an upsampling factor, required after the video stream is decoded, that identifies whether a coded resolution of the additional view video stream is the same as a coded resolution of the base video stream or different from the coded resolution of the base video stream.

2. The method of claim 1, further comprising:

receiving a PMT having the first descriptor or multiple descriptors, wherein the multiple descriptors have the first descriptor and either the second descriptor providing information related to the service-compatible stereoscopic 3D service or a third descriptor providing information related to the frame-compatible stereoscopic 3D service; and processing the PMT having the first descriptor or multiple descriptors, wherein the third descriptor is located in a loop following ES_info_length field in the PMT.

3. The method of claim 2, wherein the second descriptor further comprises fourth data indicating that the additional view video stream is able to be used for the 2D video service.

4. The method of claim 3, wherein the first field corresponds to an elementary PID of the PMT and the second field corresponds to a stream type of the PMT.

5. The method of claim 4, wherein a location of the first descriptor within the PMT is different from a location of the second descriptor within the PMT.

* * * * *